United States Patent [19]

Grossman et al.

[11] Patent Number: 5,682,486
[45] Date of Patent: Oct. 28, 1997

[54] VIDEO DISPLAY AND CONTROL OF MULTIPLE GRAPHICAL INTERFACES

[75] Inventors: Bertrand M. Grossman, New York; Clifford Alan Pickover, Yorktown Heights, both of N.Y.

[73] Assignee: International Business Machines Corporation, Armonk, N.Y.

[21] Appl. No.: 404,393

[22] Filed: Mar. 14, 1995

[51] Int. Cl.$^6$ ........................................................ G06F 3/00
[52] U.S. Cl. ........................... 395/339; 395/342; 395/346; 395/348; 395/329
[58] Field of Search ....................................... 395/153, 155, 395/156, 157, 159, 160, 161, 200.01, 339, 342, 346, 348, 329; 345/2, 3

[56] References Cited

U.S. PATENT DOCUMENTS

| | | | |
|---|---|---|---|
| 5,107,443 | 4/1992 | Smith et al. | 395/158 |
| 5,384,667 | 1/1995 | Beckwith | 360/33.1 |
| 5,392,400 | 2/1995 | Berkowitz et al. | 395/200.01 |
| 5,446,866 | 8/1995 | Drako et al. | 395/500 |
| 5,455,910 | 10/1995 | Johnson et al. | 395/650 |
| 5,459,825 | 10/1995 | Anderson et al. | 395/133 |

FOREIGN PATENT DOCUMENTS

| | | |
|---|---|---|
| 6332652 | 12/1994 | Japan . |
| 7044349 | 2/1995 | Japan . |

OTHER PUBLICATIONS

Automated Patent System, *Automated Patent System Technical Baseline II* APS–PM–CNT–00–02.10, US Patent and Trademark Office, Feb. 1994, pp. 2–45 to 2–48 and 3–110 to 3–113.

Young et al., *The X Window System Programming & Applications with Xt*, Prentice Hall, 1992, p. 5.

R. Sedgewick, Elementary Geometric Methods, Algorithms, Second Edition, Addison–Wesley Publishing Company, pp. 353–355.

Graphics Programming Concepts, IBM RISC System/6000, pp. 6–12, 6–13, 5–1, 5–2, 2–13, 2–14.

Adrian Nye, Xlib Programming Manual for Version 11 of the X Window System, vol. 1, pp. 1–7.

K.R. Banning et al, Architecture for a Visual System Administration User Interface, Technical Disclosure Bulletin, vol. 37, No. 07, Jul. 1994, pp. 55–58.

T.J.L. Shrader et al, Concise Multi–Icon Representation for Multiple Icons, Technical Disclosure Bulletin, vol. 36, No. 10, Oct. 1993, pp. 345–346.

S.G. Li et al, Drag–Drop Technique for Connecting Source and Target Objects in an Application Builder Environment, Technical Disclosure Bulletin, vol. 36, No. 8, Aug. 1993, pp. 365–366.

*Primary Examiner*—Heather R. Herndon
*Assistant Examiner*—Stephen Hong
*Attorney, Agent, or Firm*—Louis J. Percello; Ronald L. Drumheller

[57] ABSTRACT

Windows, icons, or TV channel selections can be conveniently moved between multiple monitors controlled by a single device such as a computer. The monitors may be cathode ray tubes (CRTs) for liquid crystal displays (LCDs). Inter-monitor movement is achieved using a "transport" region into which icons, windows, or TV channel selections are moved on a particular monitor. Once in this region, the icons, windows, or TV channel selections transport from the current monitor to a second monitor. In instances where a large number of icons are used, this is a means for consolidating, managing, and displaying them in an organized way.

11 Claims, 4 Drawing Sheets

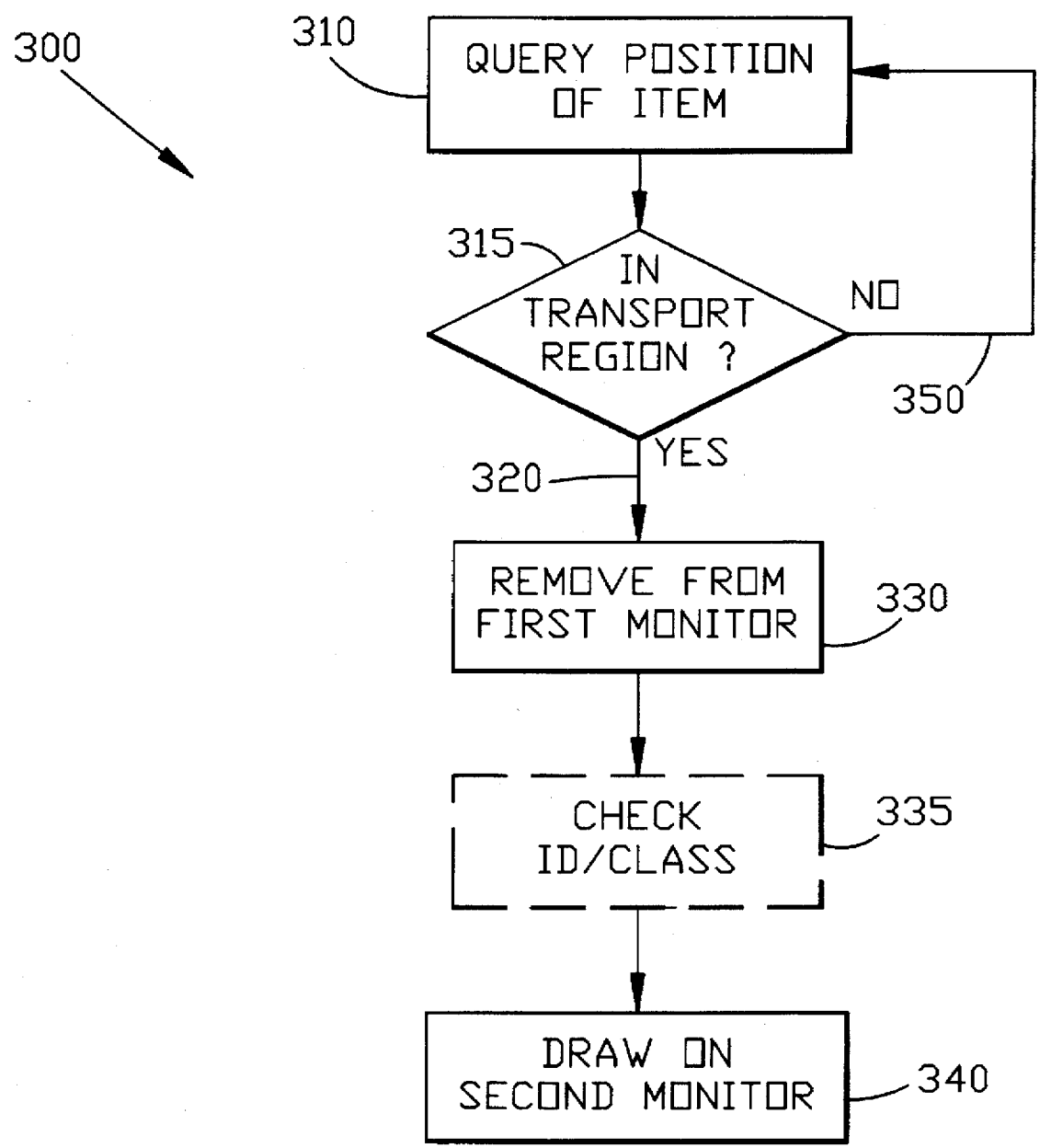

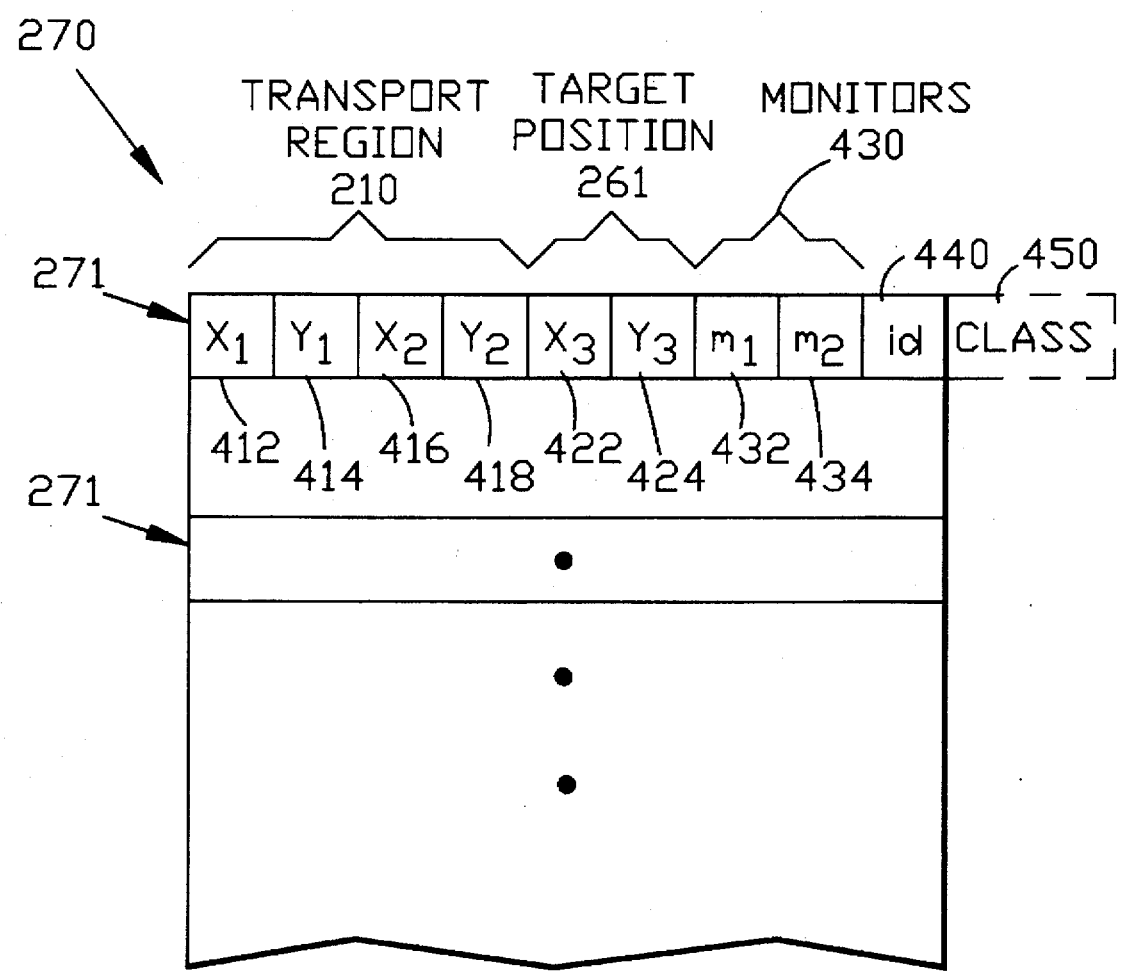

VIDEO DISPLAY AND CONTROL OF MULTIPLE GRAPHICAL INTERFACES

FIELD OF THE INVENTION

This invention relates to displays on graphical interfaces. More specifically, the invention relates to selectable icons or windows displayed on a graphical interface such as a computer monitor or television.

BACKGROUND OF THE INVENTION

Graphical user interfaces (GUIs) provide ways for users of computers and other devices to effectively communicate with a computer. In GUIs, available applications and data sets are often represented by graphical images such as icons and windows which can be directly manipulated and selected by the user, rather than having to manually type a command to initiate a program. Icons can be tiny on-screen symbols that simplify access to a program, command, or data file. Icons are usually activated by moving the mouse-controlled cursor onto the icon and pressing a button or key.

GUIs include graphical images on computer monitors. A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

GUIs can be used to control any apparatus having a monitor. In the field of television (TV), channel selection can be affected by selecting an icon consisting of the animated video broadcast on that channel frequency.

GUIs are often tedious and frustrating to use. Windows and icons must be maintained in a logical manner. It is difficult to organize windows and icons when many are displayed on multiple monitors controlled by a single device.

OBJECTS OF THE INVENTION

An object of this invention is an improved system and method for organizing and managing video information on multiple monitors controlled by a single device such as a computer.

Another object of this invention is an improved system and method for organizing, displaying, and managing graphical images on graphical interfaces on multiple monitors controlled by a computer whereby each graphical image can have selectable items, icons, and/or windows.

Another object of this invention is an improved system and method for organizing, displaying, and managing windows on multiple channel television monitors.

SUMMARY OF THE INVENTION

This invention permits users to conveniently view, organize, and manipulate multiple graphical images like windows, icons, or TV channel selections (appearing as a window on a TV monitor) on systems that have two or more monitors controlled by a single computer. These windows, icons, or TV channel selections can be conveniently moved between multiple monitors. Inter-monitor movement is achieved using a "transport" region into which icons, windows, or TV channel selections are moved on a source monitor. Once in this region, the icons, windows, or TV channel selections transport from the source monitor to one or more monitors called destination or target monitors. In instances where a large number of graphical images are used, this is a means for consolidating, managing, and displaying these graphical images in an organized way.

BRIEF DESCRIPTION OF THE DRAWINGS

FIG. 3 is a flow chart showing the steps of one preferred algorithm of the present invention.

FIG. 4 is a block diagram of a data structure that defines the transport region and the destination of the transported icon/window.

DETAILED DESCRIPTION OF THE INVENTION

Figure 1:
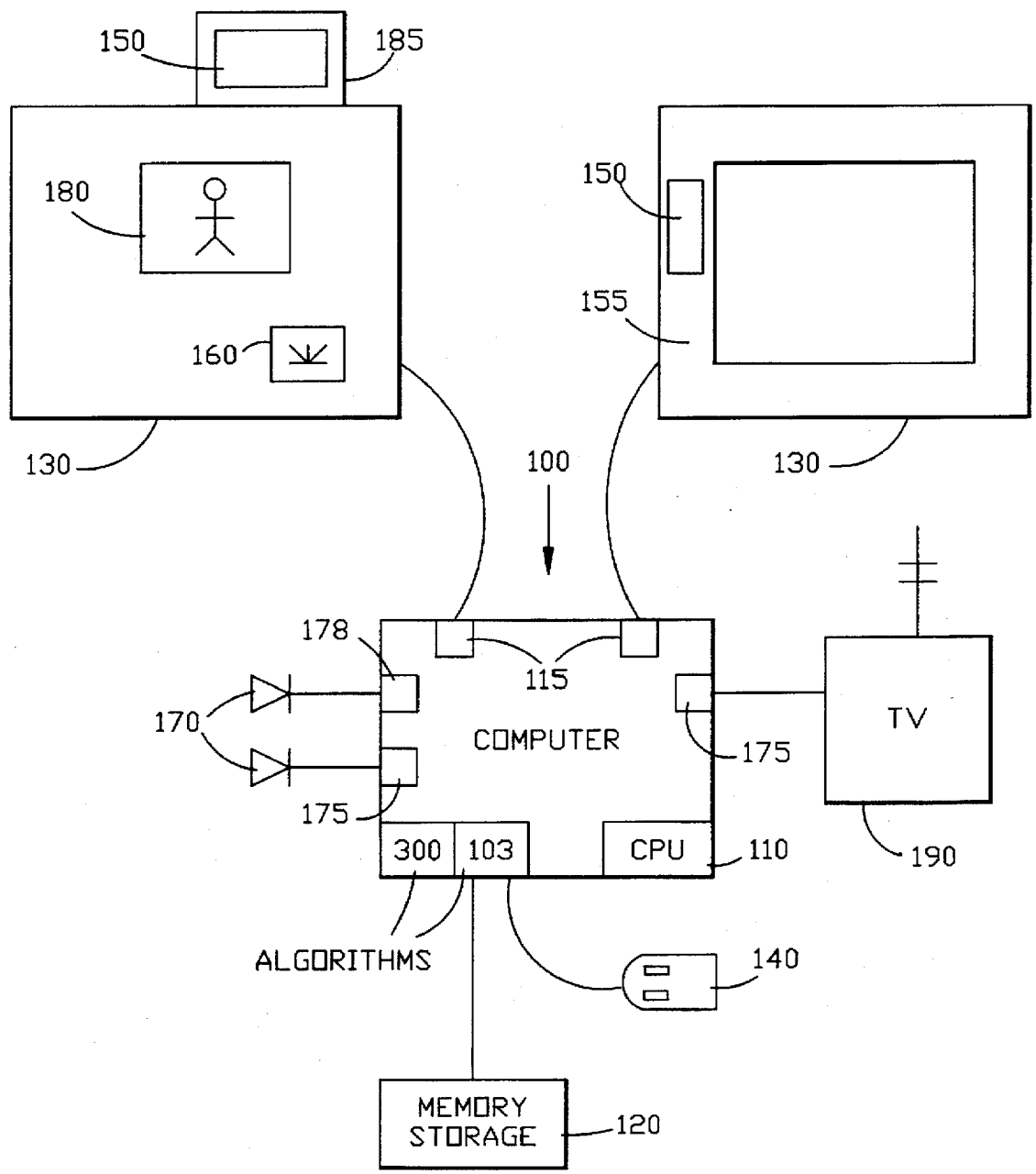
FIG. 1 is a block diagram of the hardware of one preferred embodiment of the present invention.

The present invention is capable of running on any general purpose computer system or microprocessor controlled television, preferably units which have the ability to present multimedia information. One preferred embodiment is schematically represented in a block diagram in FIG. 1. A computer system 100 consisting of a control processing unit (CPU) 110, memory storage device 120, two or more monitors or graphical interfaces 130 (a source and target monitor), and selection device 140 such as a mouse or speech recognition system 178. In one embodiment, a IBM RISC SYSTEM/6000 100 comprises a control processing unit (CPU) 110, memory storage device 120, multiple monitors 130, and a mouse 140. The mouse 140 may be used to select graphical images like icons 160 or windows 180. (Note that graphical images are also referred to as selectable items herein.) On an IBM RISC System/6000 multiple monitors 130 can be controlled by multiple monitor adaptor cards 15 such as the IBM RISC System/6000 Color Graphics Display Adaptor. The computer system 100 may also have audio input/output capability 170. An ActionMedia II Display Adapter 175 (described in the IBM Action Media II Technical Reference) can be used for audio/video playback 170.

This adaptor 175 may also be used to display TV broadcasts/signals 190 and other full motion video and sound audio/visual on the monitors 130.

In addition, speech recognition 178 may be provided (such as the IBM VoiceType Dictation Adapter).

In an alternative embodiment, the CPU 10 can be used in a client/server network where the target monitors are connected to the network.

Systems 100 that can be used to display graphical images, like icons and windows, are well known.

One of the monitors may be an auxiliary flat panel display 150, such as a liquid crystal display (LCD) 150, attached to the bezel 155 of a monitor 130, or attached to a hinged or slide-out door 185 that call be retracted when not in use.

The auxiliary flat panel display 150 can be any flat, two-dimensional, display capable of displaying text and images such as icons 160. Hereafter these flat panel displays 150 will be referenced as LCDs without loss of generality. These displays are on the order of one quarter of an inch in thickness and use very little power. Other embodiments are thicker and are backlit. In a preferred embodiment, the LCD 150 is small enough in area to fit on a bezel 155 of the monitor 130 but large enough to show at least one icon. In other preferred embodiments, a larger LCD can be placed on a hinged door(s) 185 (on the order of 1 to 100 square inches—more preferably 10 to 40 square inches) that is physically attached to one or more of the monitors 130. The door 185 can also be placed in a track inside the monitor so that the door 185 on which the LCD 150 is mounted can slide into and out of the body of the monitor 130. While LCDs 150 like this are well known, attaching them to monitors 130 in this manner is considered novel.

The LCD 150 can be mounted on the bezel 155 by culling a hole in the bezel 155 in order to inset the LCD. Alternatively, the LCD 150 can be glued to the outside of the bezel 155 with appropriate electrical connectors (pins, wires, etc.) passing through the bezel 155 in order to connect the LCD 150 to its driving circuit inside of the monitor 130.

If the LCD 150 is mounted on a hinged or sliding door 185, the LCD 150 can be fixably mounted to the door by glue or other fasteners. Flexible electrical connectors then connect the LCD to its driving circuit.

Figure 2:
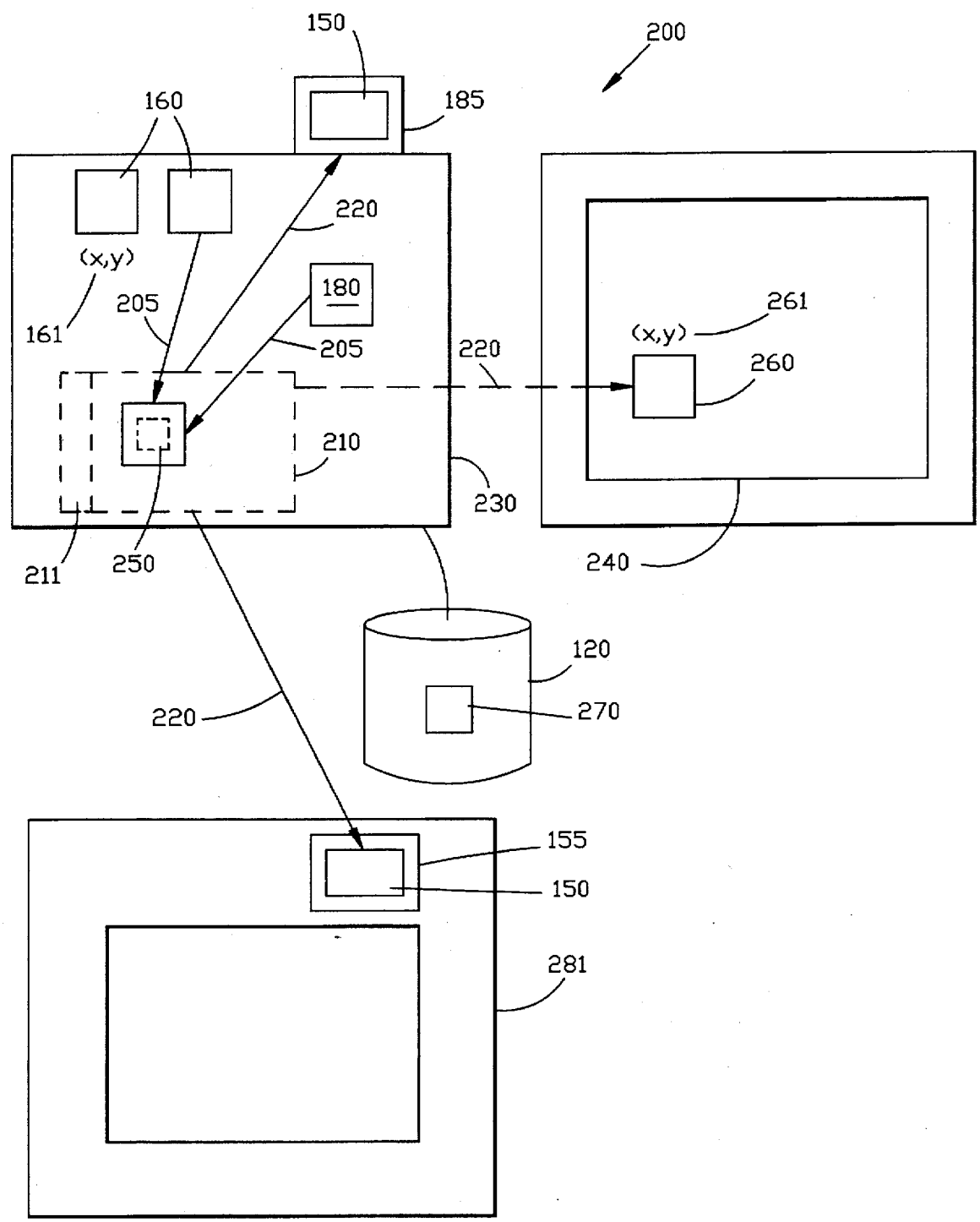
FIG. 2 is a drawing of three monitors with graphical images/selectable items on a graphical interface and a transport region.

FIG. 2 is a block diagram of a system 200 showing graphical images/selectable items (such as icons 160, windows 180, or animated images) appearing on a source monitor 230. A selectable icon 160 or window 180 may be dragged 205 to a transport region 210 on the source monitor 230 using a mouse 140 or other selecting device 140. (Note that other graphical images like windows, animated images, and multimedia icons can also be dragged 205 in like manner.) The selectable icon 160 or window 180 is transported 220 to a second, target monitor 240 by fading or disappearing 250 from the transport region 210 and reappearing 260 on the target monitor 240. In a similar manner, the icon 160 and/or window 180 can be transported 220 to more than one target monitor and/or to one or more bezel 155 (or hinged 185) mounted auxiliary LCDs 185). See monitor 281. (Note that monitors 230 and 240 are the same as monitors 130 described above.)

The size and shape of the transport region 210 may be defined by a user profile 270 on the memory storage device 120. This user profile 270, which can exist as a data file, may contain, for example the minimum and maximum x,y coordinates for a rectangle bounding the transport region 210. The location 260 to which the icon (graphical image) is transported on the target monitor 240 also may be controlled in a user profile 270. Note that the position of the icon 160 or window 180 is designated as a source position 161 on the source monitor 230 and a target position 261 on the target monitor 240.

FIG. 3 is a flow chart showing the steps performed by a transport algorithm 300 executed by system 100 or 200.

The transport algorithm 300 first queries 310 a source position 161 of a selectable item, i.e. graphical image (160 or 180) on the source monitor 230. Methods for determining the position 161 (FIG. 2) of a selectable item (graphical image) are well known.

In step 315, the source position 161 of the selectable item/graphical image is checked to determine if the source position 161 is within the transport region 210. If the item source position 161 of the selectable item is in the transport region 210, the selectable item is removed 320 from the source monitor 330 and drawn on the target monitor 340. This is the transport action 220. If the item is not inside the transport region 350, no action is taken. The determination of whether an item is inside the transport region 210 is accomplished using simple geometrical algorithms known to those skilled in the art.

The selectable item (graphical image) is drawn 340 on the target monitor at a target position (261 in FIG. 2). The location of the target position 261 of the item on the target (or destination) monitor 240 may be controlled by a user profile 270 in memory storage 120. This can be accomplished, for example, with a user profile 270 containing identifying numbers associated with item(s) 160 and an x,y location for the target position of the item(s) 260 on the target monitor 240.

The present invention may be used to help organize transported 220 graphical images. For example, items relating to one application may be transported to the top of the target monitor. Items relating to multimedia applications may automatically be transported to the bottom of the target monitor. Alternatively, selectable items can be located at certain target positions on the target monitor as determined by the identity of the selectable item or class of the selected item. The target monitor on which a selectable item appears can also be determined by the selectable items identity or class. A class is a set of graphical images that share some common characteristic. The members of this set each have a unique identity. For example, graphical images for text processing and mail would fall under the class of office systems applications whereas scientific plot programs and calculators would fall under the class of scientific application programs.

In these cases, an additional function can be included in step 335 to check the selectable item's identity or class and designate the target monitor based on this information.

FIG. 4 is a block diagram of a typical data structure 270 that defines the transport region, the target monitor 240, and the target position 261 of the transported icon/window. In a preferred embodiment, a data record 271 resides in the user profile 270. The data record consists of the following:

x1—the x coordinate value 412 for the lower left corner of the transport region 210.

y1—the y coordinate value 414 for the lower left corner of the transport region 210.

x2—the x coordinate value 416 for the upper right corner of the transport region 210.

y2—the y coordinate value 418 for the upper right corner of the transport region 210.

x3—the x coordinate value 422 for the destination (target position 261) of the transported icon. The x coordinate of a specified point (e.g. a corner or center) on the transported icon will be located at the position x3.

y3—the y coordinate value 424 for the destination (target position 261) of the transported icon. The y coordinate of a specified point (e.g. a corner or center) on the transported icon will be located at the position y3.

m1—the identifying number 432 for the source monitor 230 from which the icon is transported.

m2—the identifying number 434 for the target monitor 240 to which the icon is transported.

id—icon identification number 440.

c—class identification number 450.

In this embodiment, data elements 412, 414, 416, and 418 define the transport region 210 while data element 422 and 424 define the target position 261 on the target monitor 240. Although the data structure 270 is described for a rectangular transporter region 210, a similar structure would apply to other shaped transporter regions 210. An icon's class 450 can determine an icon's target monitor. In this way, all graphical images with the same class number 450 may be consolidated at a particular position on a particular target monitor. Also, each graphical image within a class is uniquely identified by its icon identification number 440.

Graphical images (hereafter also referenced as "selectable items"), 160 and 180, need not be static but may consist of animated images. Animated objects on the monitor may be created using a technique called double buffering. For smooth motion, the system displays a completely drawn image for a certain time (for instance, 0.01 seconds), then presents the next frame completely drawn during the next time period, and so on. Double buffering makes this process fast. The system's standard bitplanes are divided into two halves, only one of which is displayed. Drawing is typically done into the other invisible half. When drawing is complete, the buffers are swapped. In the language GL this buffer swapping is performed using the swapbuffers( ) routine.

Dragging 205 of selectable items (160 or 180) with a mouse 140 allows the user to select any item and, for example, to move an item to the transporter region 210. The graphical notions of "picking," "selecting," and "dragging" are well known to graphics programmers. For example, the graphics language GL provides a mechanism called "picking" for returning information about where graphical primitives (such as the pages in the carousel) are being drawn. Picking returns all primitives that are currently being drawn in the vicinity of the cursor. That is, picking is used to identify the drawing primitive, such as a page, on the screen that appears near the cursor. When the system is in picking mode, it checks for "hits," whereby a hit occurs every time that a drawing primitive intersects the picking region. The picking region is a rectangular area of the screen, centered about the location of the cursor. By default, for example, it is 10×10 pixels in size. The system records hits by writing data into a picking buffer. The actual data that is recorded may be an identifying number associated with a icon 160 or window 180. The act of assigning such pick numbers is known to graphics programmers. For example, in GL it is done with the loadname(n) command, where n is an integer identifying the selectable item. The x,y location of the mouse driven cursor may be obtained using the X-windows function XQueryPointer( ).

In one preferred implementation, the X-windows interface is used for displaying the graphical images. In X-windows, the target monitor for a particular selectable item such as an icon is controlled via Display and Screen settings. These settings control the monitor on which the selectable item appears using simple numerical identifiers. The X-windows system supports multiple monitors and window manager styles.

X-windows also is a distributed-network windowing system. In a distributed-network computing environment, graphical images can be displayed on target monitors that are primarily controlled by target computer system. In this situation, the selection, transport, and display of the graphical image is controlled by the computer system running the source monitor.

In a typical scenario, a user wishes to move an icon from monitor 1 (the source monitor) to monitor n (target monitor). These monitors are specified by m1 432 and m2 434 in the data record 271. First, the user selects the icon and drags it to the transporter region 210 on monitor 1 (m1=1, see FIG. 4.) Alternatively, the icon selection and movement may be accomplished using voice commands interpreted by a speech recognition system 178. (For example, the user says, "Move printer icon into transporter region.") The system detects 320 the fact that the icon is in the transporter, searches the data structure 270 for the data record 271 containing the appropriate icon identification number 440 and class number 450. Once the record is found, the target monitor m2 field 432 is read. The icon is redrawn 340 on monitor n after the system has determined the icons target position (x3, y3: 422,424) in the data structure 270 associated with the selectable item's (icon's) identification number 440.

The "icon" to be transported need not be static but may consist of animated images or TV broadcasts/signals displayed in a window or icon. The target monitors may be local (e.g., on the same desktop) or in a remote location connected via a network.

The target or destination device need not be a monitor, but can be a device such as a video cassette recorder (VCR), printer, or other analog or digital storage device. When the TV broadcast is transported to a VCR, the VCR's record function may be enabled so that the VCR records the broadcast.

In another preferred embodiment, the source monitor 230 can be at a point of sale terminal, kiosk, or could be an interactive television. The source monitor 230 (or computer system 100) would include a known algorithm 103 to gain information about the user such as user identification and user account information. The transport region 210 might have a title 211 that designates some function that the user initiates, e.g. "order item". The selectable items 160 would represent merchandise or services that the user would order. For example, a selectable item might represent a movie or a pair of shoes that the user wants to order. By dragging 205 the icon (movie, shoes) into the transport region 210, the icon along with the user information is transported to a target monitor 240 accessible to the merchandise/service provider. When the icon is received at the target monitor, the merchandise/service provider orders the merchandise (shoes) or performs the service (sends the movie) to the user and charges the user account. Functions like this might be useful in banking, home shopping, video stores, retail malls, take-out restaurants, catalog sales, etc. The application can be extended to providing information. For example, if the source monitor is an information kiosk at a retail mall, the user can transport a "shoe" icon to receive directions from a service provider on how to get from the kiosk to the shoe stores in the mall.

Given this disclosure, one skilled in the art can devise alternative embodiments for this invention that are within the contemplation of the inventors.

We claim:

1. A computer system providing multiple graphical interfaces simultaneously between a single computer and a single user, comprising:

a. a computer system having a source monitor and a target monitor connected to and controlled by a single computer simultaneously, the source monitor providing a source graphical interface between a user and said single computer and the target monitor simultaneously providing a target graphical interface between said user and said single computer;

b. means for representing an object on the source graphical interface as an icon;

c. means for graphically indicating a transport region on the source graphical interface, said transport region having a size sufficient to receive said icon therein;

d. a selection device for dragging said icon under user control and dropping said icon into said transport region; and e. means for automatically and continuously determining whether the position of said icon on the source graphical interface is within said transport region and for automatically causing said icon to disappear from the source graphical interface when said icon is positioned within said transport region and to appear on the target graphical interface.

2. A system, as in claim 1, where the target monitor is a liquid crystal display physically mounted to the source monitor.

3. A computer system providing multiple graphical interfaces simultaneously between a single computer and a single user, comprising:

a. a computer system having a source monitor and a plurality of target monitors connected to and controlled by a single computer simultaneously, the source monitor providing a source graphical interface between a user and said single computer and the target monitors each simultaneously providing a target graphical interface between said user and said single computer;

b. means for representing an object on the source graphical interface as an icon;

c. a data structure stored in said computer, said data structure identifying said icon, identifying said source graphical interface and determining a particular one of said target graphical interfaces;

d. means for graphically indicating a transport region on the source graphical interface, said transport region having a size sufficient to receive said icon therein;

e. a selection device for dragging said icon under user control and for dropping said icon into said transport region; and f. means responsive to said stored data structure for automatically and continuously determining whether the position of said icon on the source graphical interface is within said transport region and for automatically causing said icon to disappear from the source graphical interface when said icon is positioned within said transport region and to appear on the target graphical interface determined by said data structure.

4. A computer system as defined in claim 3 wherein said data structure also defines the position and size of said transport region graphically indicated on the source graphical interface.

5. A computer system as defined in claim 3 wherein said data structure also defines the position on said target graphical interface at which said icon will appear.

6. A computer system as defined in claim 3 wherein said data structure identifies a class id for said icon, said class id determining a region of said target graphical interface in which said icon will appear.

7. A computer system as defined in claim 3 wherein said data structure identifies a class id for said icon, said class id determining a position on said target graphical interface at which said icon will appear.

8. A computer system as defined in claim 3 wherein said data structure identifies a class id for said icon, said class id determining said particular one of said target graphical interfaces.

9. A computer system as defined in claim 3 wherein said data structure identifies said icon with an icon id and said particular one of said target graphical interfaces is determined from said icon id.

10. A system as in claim 3 wherein the source monitor includes a bexel surrounding a display screen and at least one of the target monitors comprises a liquid crystal display physically mounted to the bezel of the source monitor.

11. A system as in claim 3 wherein the source monitor includes a case having a door and at least one of the target monitors comprises a liquid crystal display mounted to the door.

* * * * *